(No Model.)

W. H. UPHAM & C. W. SCOVILL.
BELT SHIPPER.

No. 253,900. Patented Feb. 21, 1882.

Attest:
Herm Lauten
Robert Melcher

Inventor:
Wm. H. Upham
Chas. W. Scovill
By Wm. G. Henderson
Attorney.

UNITED STATES PATENT OFFICE.

WILLIAM H. UPHAM AND CHARLES W. SCOVILL, OF COHOES, NEW YORK.

BELT-SHIPPER.

SPECIFICATION forming part of Letters Patent No. 253,900, dated February 21, 1882.

Application filed December 24, 1881. (No model.)

*To all whom it may concern:*

Be it known that we, WILLIAM H. UPHAM and CHARLES W. SCOVILL, citizens of the United States of America, residing at Cohoes, in the county of Albany and State of New York, have invented certain new and useful Improvements in Belt-Shippers; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figure 1:
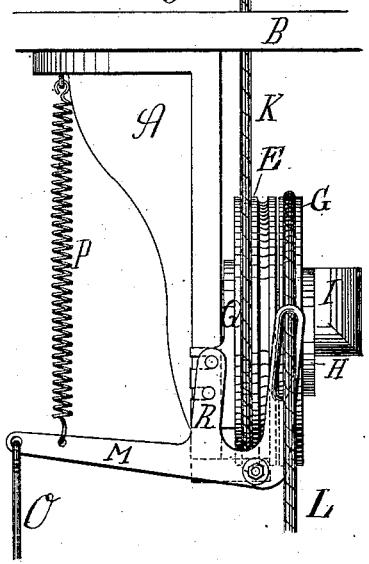
Figure 2:
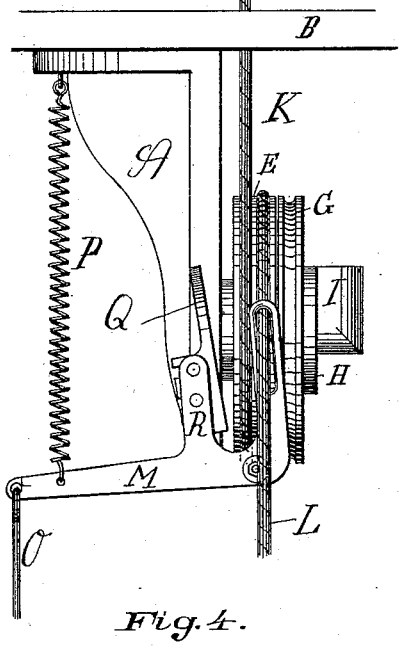
Figure 3:
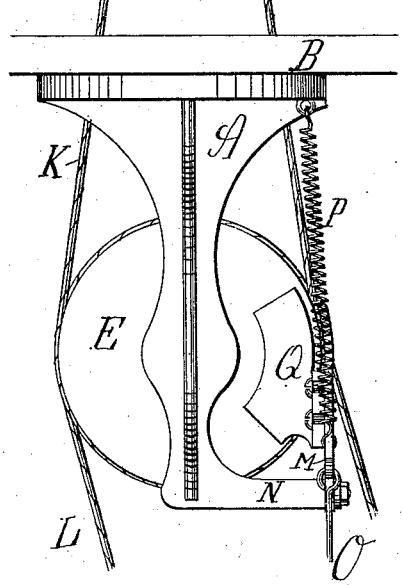
Figure 4:
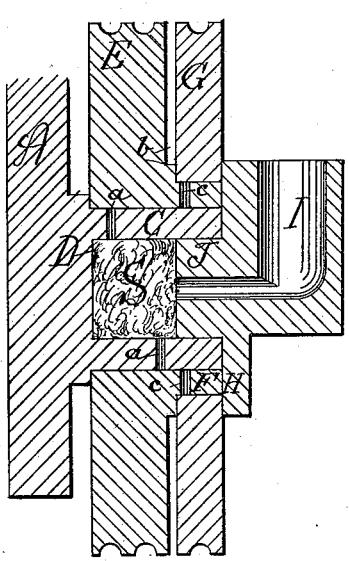

Figure 1 is a front elevation, showing the position of the shifter and brake when the sewing-machine is not running; Fig. 2, a front elevation, showing the position of the shifter and brake when the machine is running; Fig. 3, a side elevation of the parts, and Fig. 4 a vertical cross-section through the center of their journals or shafts.

Our invention has reference to devices for shifting belting from one pulley to another, and for checking the revolution of the pulleys, and it is specially adapted for use in connection with sewing-machines in mills, where a large number of the machines are run by suitable power, but need not be confined to that use; and it consists in the construction and the combination of parts hereinafter particularly described, and then sought to be specifically defined by the claims.

In the accompanying drawings, the letter A indicates a bracket, supported in any suitable manner, but for illustration represented as suspended from the table or platform B, on which the sewing-machine rests. From the side of the bracket there projects a shaft, C, which is bored out, and has one or more holes, *a*, formed therein, the same passing from the circumference of the shaft into the chamber D, formed by boring, as already stated. On the shaft C there is mounted so as to turn thereon a pulley, E. The periphery of this pulley is formed so as to best hold the kind of belting used, whether it be flat, V-shaped, or, as represented in the drawings, round. The same pulley is provided with a sleeve, F, which fits to the shaft C, like the pulley itself, and on the pulley there is fitted, so as to turn, an idle-pulley, G, the latter being held from contact with pulley E by a collar, *b*, formed on either one of the pulleys, but represented in the drawings as being on pulley E, the function of the collar being to reduce the friction between the pulleys. The sleeve F has one or more holes, *c*, formed in it as and for the same purpose as the holes formed in shaft C. The pulley G is held on pulley E or its sleeve, and the latter on the shaft C by the collar H, which is formed in one piece with cup I and its stem J, the stem fitting into the chamber D. If desired, the collar may be made separate from the cup and the stem of the latter passed through it; but the construction shown is the better of the two. The periphery of pulley G is formed like that of pulley E, and the two pulleys are near enough together to permit the belting to be shifted from one to the other. The belt K passes from pulley E to the pulley or wheel of the sewing-machine which it drives, and the belt L passes from the pulley E, which it revolves, down to and over the pulley keyed to the main shafting, from which it receives its power.

The arrangement of the main shafting and method of connecting the drive-pulleys to the sewing-machines are both well known, being nothing more than what are commonly employed, and will not, therefore, be illustrated and described in detail.

The belt L is the one which is shifted or shipped from the drive-pulley to the idle-pulley and back again, the means employed for that purpose being the lever M. The lever illustrated is of the bell-crank order, one end thereof being slotted, as shown in Figs. 1 and 2, so that the belt L may pass therethrough, and it is fulcrumed at its elbow by a bolt passed through it and secured to the L of an arm, N, projecting from the bracket A. Any other method of fulcruming the lever may be adopted, provided it permits the lever to be operated so as to shift the belt back and forth. To the long arm of the lever a rod, O, is connected, and to the lower end of the rod a pedal is secured, so that the operator may work the lever with his foot. A spring, P, connects the same arm of the lever with the top of bracket A or some other part of the machine, so that it will draw back the arm of the lever when the foot is taken off the pedal. A brake or shoe, Q, is connected to the lever, so as to be thrown against the side of pulley E for the purpose of checking its rotation when the machine is to be stopped. The shoe is provided with a slotted flange, and is secured to an arm, R, of the lever by headed screws or bolts passed through the slots and into the arm. By thus securing the shoe to the lever it may be adjusted to and from the pulley, so as to be made to bear with greater or less pressure against the pulley, as found desirable, and by making one slot longer than the other the shoe may be adjusted so as to stand at an oblique angle to the arm to which it is secured, so that the face of the shoe will by degrees be brought against the side of the pulley, and as a result the rotation of the pulley will be gradually checked and no injury be done the machine by too suddenly stopping its action.

When the machine is not running the shipper stands in the position shown in Fig. 1, the shoe bearing against the pulley E, while the belt L will be on the idler G. When the machine is to be started and run the operator bears with his foot upon the pedal, so that the long arm of the lever or shipper is borne down and the short or slotted arm thrown inwardly, carrying with it the belt L and shipping it from the idler G to the pulley E, as seen in Fig. 2, whereby the machine is put in motion and run so long as the parts are held in the position illustrated in Fig. 2. As soon as the foot is taken from off the pedal the spring P will draw up the long arm of the shipper, whereby the belt will be shipped from the drive-pulley to the idler and the shoe thrown against the former, and the action of the machine will be thus checked.

The shipper can be placed in any position where it will operate as described without departing from the spirit of our invention.

The cup I is filled with oil, which runs from it into chamber D and saturates the cotton waste S, placed therein, and from the waste it passes through holes $a$ to pulley E, and from between it and the shaft through $c$ to the idler G, and thus the several parts are lubricated.

Having described our invention, what we claim is—

1. The combination of a drive-pulley, an idle-pulley, a shipper for transferring a belt from one pulley to the other, and a shoe connected to the shipper and operated thereby so as to be thrown against the drive-pulley when the belt is shipped from that to the idle-pulley, and away therefrom when the belt is shipped back, substantially as set forth.

2. The combination, with a drive-pulley and idle-pulley, of a shipper adapted to ship a belt from one pulley to the other, and an adjustable shoe connected with and operated by the shipper so as to be thrown against the drive-pulley and away therefrom as the belt is shipped from off and onto said pulley, substantially as set forth.

3. The combination of a drive-pulley and idle-pulley, a shipper for shipping a belt from one of said pulleys to the other, a shoe connected with and operated by the shipper, means for moving the shipper and shoe in one direction, and a spring for moving them in the opposite direction, substantially as set forth.

4. The combination of a drive-pulley provided with a sleeve and fitted over a shaft so as to turn thereon, an idle-pulley fitted to the sleeve of the drive-pulley so as to turn thereon, a shipper for transferring a belt from one of said pulleys to the other, and a shoe connected with the shipper and operated by it, substantially as set forth.

5. The combination of a pulley provided with a perforated sleeve and mounted on a hollow perforated shaft, a pulley mounted on the sleeve of the first pulley, and a collar and cup for respectively holding the pulleys on the shaft and for feeding a lubricant thereto through the said shaft, substantially as set forth.

In testimony whereof we affix our signatures in presence of two witnesses.

WILLIAM H. UPHAM.
CHARLES W. SCOVILL.

Witnesses:
HENRY A. STRONG,
CHARLES E. LANSING.